US011669543B2

(12) United States Patent
Danilov et al.

(10) Patent No.: US 11,669,543 B2
(45) Date of Patent: Jun. 6, 2023

(54) OBJECT-LEVEL REPLICATION INCLUDING BULK-MODE REPLICATION IN A DATA STORAGE SYSTEM

(71) Applicant: EMC IP Holding Company LLC, Hopkinton, MA (US)

(72) Inventors: Mikhail Danilov, Saint Petersburg (RU); Grigorii Skripko, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 182 days.

(21) Appl. No.: 16/898,669

(22) Filed: Jun. 11, 2020

(65) Prior Publication Data

US 2021/0390113 A1    Dec. 16, 2021

(51) Int. Cl.
     *G06F 16/30*     (2019.01)
     *G06F 16/27*     (2019.01)
     *G06F 9/46*      (2006.01)

(52) U.S. Cl.
     CPC ............. *G06F 16/27* (2019.01); *G06F 9/466* (2013.01)

(58) Field of Classification Search
     CPC ...................................................... G06F 16/27
     See application file for complete search history.

(56) References Cited

U.S. PATENT DOCUMENTS

| 10,268,417 | B1* | 4/2019 | Danilov | G06F 3/0617 |
|---|---|---|---|---|
| 2009/0100112 | A1* | 4/2009 | Sharma | G06F 16/184 |
| 2013/0054523 | A1* | 2/2013 | Anglin | G06F 16/27 707/624 |
| 2016/0100004 | A1* | 4/2016 | Anglin | H04L 67/1097 709/219 |
| 2019/0354626 | A1* | 11/2019 | Roy | G06F 16/275 |
| 2020/0019532 | A1* | 1/2020 | Kashi Visvanathan | G06F 16/113 |

* cited by examiner

*Primary Examiner* — Khanh B Pham
(74) *Attorney, Agent, or Firm* — Amin, Turocy & Watson, LLP

(57) ABSTRACT

The described technology is generally directed towards bulk-mode replication of data objects to a destination replication site. When replicating a group of objects, and there is enough object data to fill one or more chunk data structures, bulk-mode data replication is performed, with the destination site replicating the objects into chunk data structures and performing erasure coding to protect the data. This avoids the need for inefficient preliminary data protection scheme at the replication destination. When there are multiple objects to be replicated but not enough object data to fill a chunk data structure, bulk-mode data replication transfers the objects to the destination site for replicating as individual objects. Standard object-level replication can be used for single object replication. The technology thus facilitates high-performance data transfer to destination replication sites and efficient handling of data at the replication destination site.

20 Claims, 11 Drawing Sheets

OBJECT-LEVEL REPLICATION INCLUDING BULK-MODE REPLICATION IN A DATA STORAGE SYSTEM

TECHNICAL FIELD

The subject application relates generally to data storage, and, for example, to a technology that efficiently replicates objects of a data storage system, and related embodiments.

BACKGROUND

Contemporary data storage systems, such as Dell EMC®'s ECS (formerly Elastic Cloud Storage) service, store data in a way that ensures data protection while retaining storage efficiency. For additional protection of user data and metadata, ECS supports geographically distributed setups of multiple zones (geographically distributed node clusters), with the data and metadata of one zone distributed and replicated to two or more zones by asynchronous replication.

Although ECS is a cluster-based object storage system, ECS maintains its data in chunks. Chunks are relatively large, e.g., 128 MB in size, and ECS provides for highly efficient chunk replication that assures high-performance data transfer over long distances.

However, ECS is evolving to support object-level replication in which individual objects are replicated, including to sites at remote regions. Replication of individual, potentially small, objects may be very inefficient, particularly with for truly geographically-dispersed systems, where replication has to work over long distances using less stable network channels. Further, a typically-sized replicated object is normally saved as part of chunk, and until the chunk is sufficiently filled, the data is protected by a preliminary protection scheme, e.g., mirroring. Later, when the chunk is filled the data is protected using erasure coding. Protecting the same data twice is generally undesirable because it produces extra data traffic within a replication destination site.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
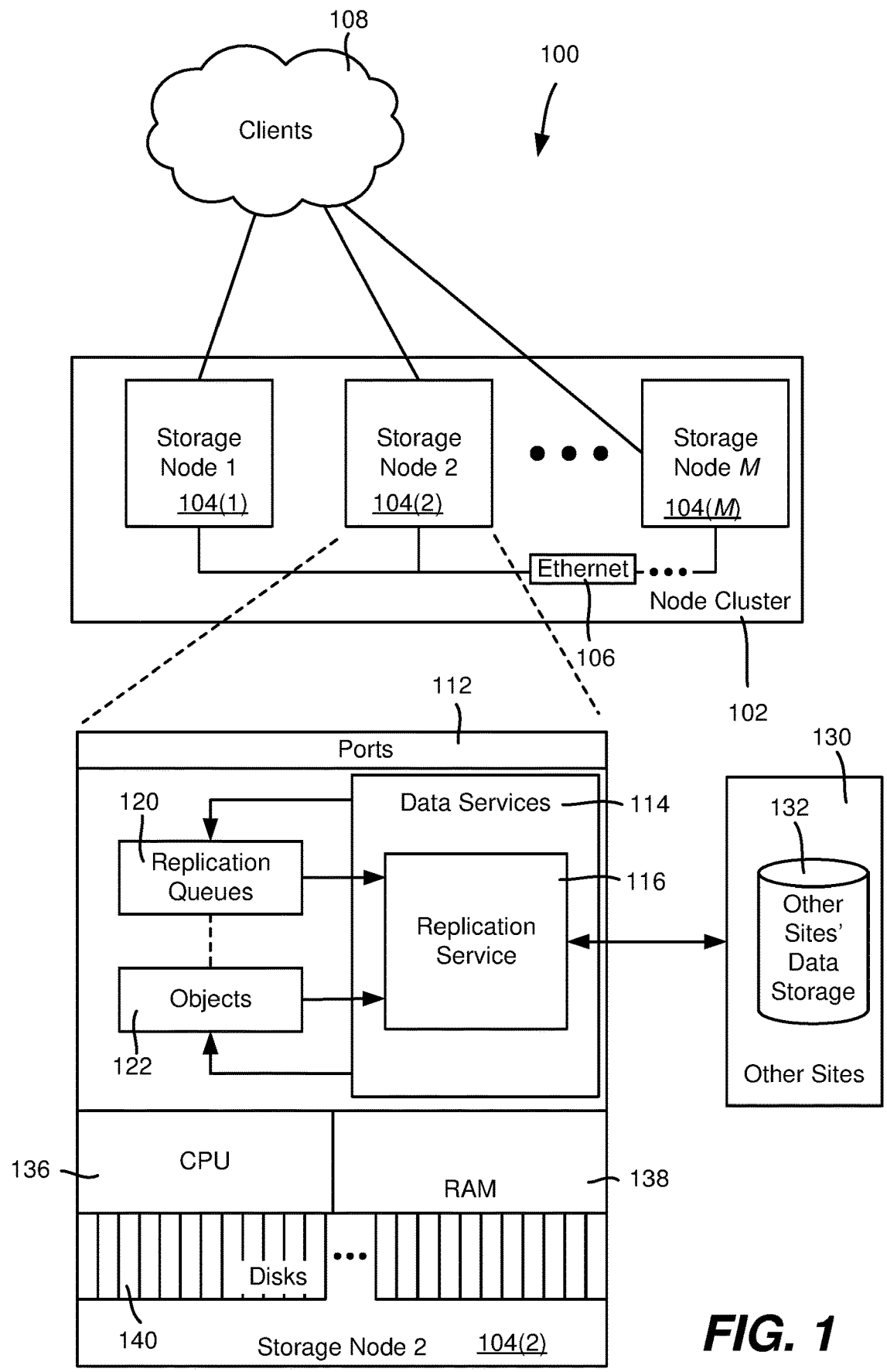
FIG. 1 is an example block diagram representation of part of a data storage system including nodes coupled to one or more other sites, in which bulk mode object replication can be performed, in accordance with various aspects and implementations of the subject disclosure

Various aspects of the technology described herein are generally directed efficient object-level replication, including in a region-based geographic (GEO) environment. In general, the technology described herein makes object-level replication as close to (highly efficient) chunk-level replication as possible. To this end, replication queues, comprising queues of replication tasks, are segmented by a replication destination region. These queues logically group together the individual objects that are destined for one region, which achieves the effect of bulk-mode replication.

When an object is created, the data service determines a "bucket" corresponding to a site to which the object is to be replicated, and queues a replication task that identifies the object in a replication queue for that site. When there are multiple objects to be replicated to a site, at an appropriate time to replicate the multiple objects, a replication service takes multiple objects identified in the site's queue, packs them into a batch, and sends the batch to the site. The service sends the batches to different sites of one region using round-robin policy or trying to level the amount of data it replicates to the sites of one region.

If the replication service has enough objects to fill one or multiple complete chunks, the replication service requests the remote site (the site chosen as the replication destination site) to create one or multiple dedicated chunks for the objects to be replicated. The destination site receives the batched object data, and stores the data to the dedicated chunk(s). Significantly, because the chunks are complete, the remote site performs online encoding of the chunks, which directly protects the data without needing a preliminary protection scheme. The destination site sends a group acknowledgement for objects stored in the already-encoded chunks. Note that the objects' metadata is sent to the destination site within the replication session. If there is not enough object data to fill a chunk, the object data are sent as a batch, but the destination stores the object data as a set of individual objects.

It should be understood that any of the examples herein are non-limiting. For instance, some of the examples are based on ECS data storage technology; however virtually any storage system may benefit from the technology described herein. As a more particular example, the term "chunk" can be used as an example of a unit of data storage, however any data block can be used in other storage systems. Still further, the technology described herein is not limited to geographic zones or other regions, but can be used with any replication site. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node, and possibly per-sub-group of nodes). For example, ECS runs a set of storage services, which together implement storage logic. Services can maintain directory tables for keeping their metadata, which can be implemented as search trees. For example, a blob service maintains an object table (e.g., in various partitions among nodes, including geographically separated zones) that keeps track of objects in the data storage system and generally stores their metadata, including an object's data location information, e.g., within a chunk. The blob service also maintains a listing table, although it is alternatively feasible to have such a listing table maintained by another service.

In one or more implementations, the data services 114 include a replication service 116, to provide replication-related operations as described herein, which can be via communications to and from sites 130 and their data storage 132. In one implementation the replication service is (or is part of) the GEO service, but can be a separate component coupled thereto. As is understood, data communications between sites can be relatively inefficient, and thus efficient replication is desirable as provided via the technology described herein.

In FIG. 1, a CPU 136 and RAM 138 are shown for completeness; note that the RAM 138 may comprise at least some non-volatile RAM. The node 104(2) further includes storage devices such as disks 140, comprising hard disk drives and/or solid-state drives, or any other suitable type of storage resource. As can be readily appreciated, components of the data storage system including those described herein can be at various times in any storage device or devices, such as in the RAM 138, in the disks 140, or in a combination of both, for example.

In ECS, disk space is partitioned into a set of blocks of fixed size called chunks, which in one or more implementations are 128 megabytes in size. The various types of data, including user data and various types of metadata, are stored in chunks. There are different types of chunks, one type per capacity user. In particular, user data is stored in repository chunks, and chunks can be shared. For instance, one chunk may (and in typical cases does) contain segments of multiple user objects.

The user data repository of chunks is maintained in a chunk store managed by another storage service referred to as a chunk manager. A chunk table maintains metadata about chunks, e.g., as managed by the chunk manager. Note that directory tables and other data can also be maintained in data chunks.

As set forth herein, geographic zones can be used to replicate data, for additional data protection. Geographic zones can be separated into regions, including different sites in a home region relative to a node cluster, and different external (e.g., remote) regions. To accomplish object-level replication-based protection, the various user data objects are replicated among the regions.

Figure 2:
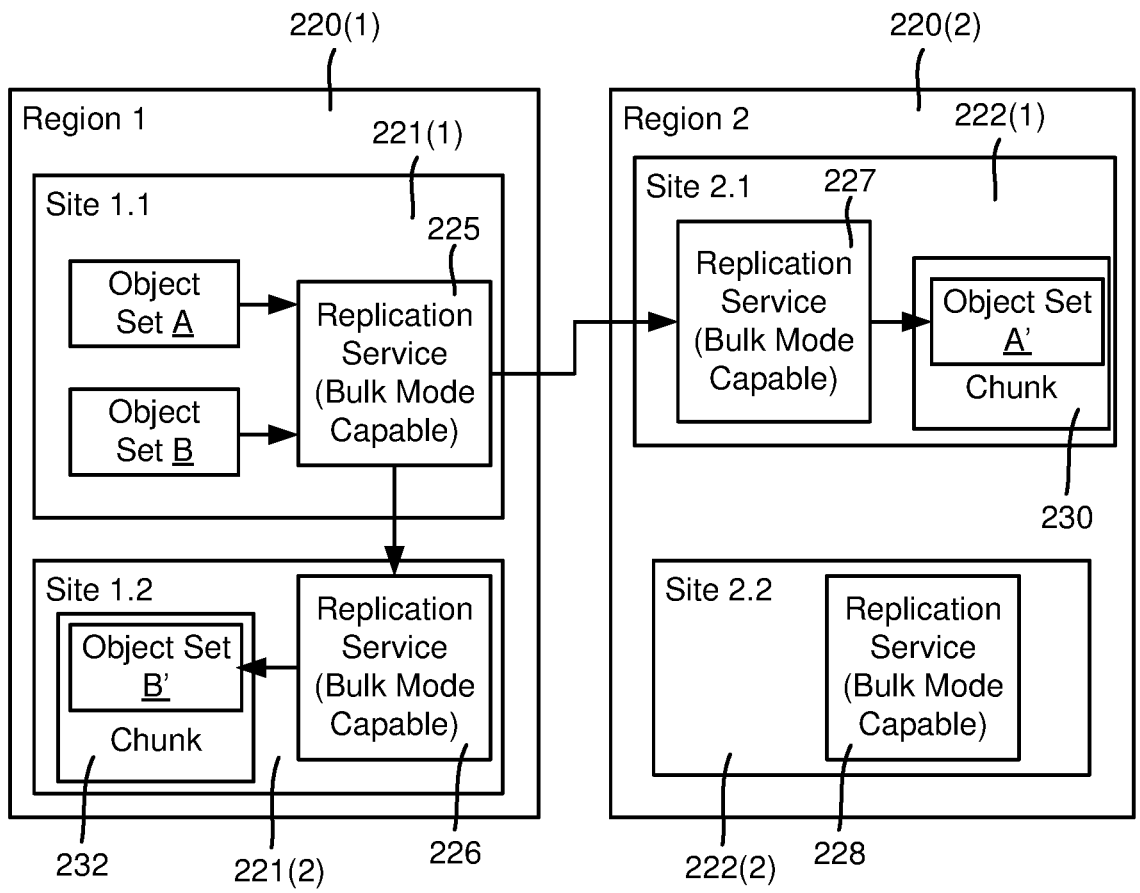
FIG. 2 is an example block diagram representing cross-region bulk mode object replication and cross-region bulk mode object replication, in accordance with various aspects and implementations of the subject disclosure

FIG. 2 shows the concept of regions, supported by ECS, with Same-Region Replication (SRR) between sites 1.1 labeled 221(1) and 1.2 labeled 221(2) of region 1 labeled 220(1). Cross-Region Replication (CRR) is also shown between sites 1.1 221(1) of region 1 220(1) and site 2.1 labeled 222(1) of region 2 labeled 220(2). In general, case, a region is a union of multiple sites. A typical arrangement is to have one region with sites that are close to each other geographically. Another way to unite sites into a region is by having a set of sites with very good throughput between them.

Site 221(1) of region 1 220 (1) creates one or more new objects, object set A. The object set A is created within a "bucket" configured to use Cross-Region Replication to region 2 220(2). Thus, object set A is replicated by a replication service 225 to a replication service 227 of a site that belongs to a different region, which is site 222(1) of region 2 220(2) in the example of FIG. 2. Note that as described herein, the replication services 225 and 227 are bulk-mode capable, whereby if the object set A fills a chunk, the replicated object set A' is batch replicated into a chunk 230, which can be directly protected by erasure coding.

Site 1.1 of region 1 also creates another object set, object set B. The object set B is created within a bucket configured to use Same-Region Replication. Thus, object set B is replicated by the replication service 225 to a site that belongs to the same region 220(1), which is site 1.2 labeled 221(2) of region 1 220(1) in the example of FIG. 2. Note that as described herein, the replication services 225 and 226 are bulk-mode capable, whereby if the object set A fills a chunk, the replicated object set A' is batch replicated into a chunk 232, which can be directly protected by erasure coding.

It should be noted that the replication configuration at the bucket level is a reason why ECS implements object-level replication. When a new object is created within a site, the object is associated with a replication bucket; a replication task is enqueued for the object. As described herein, the replication service is a storage service that handles the enqueued replication tasks and copies the user objects to one or multiple sites of the same and/or different regions.

Figure 3:
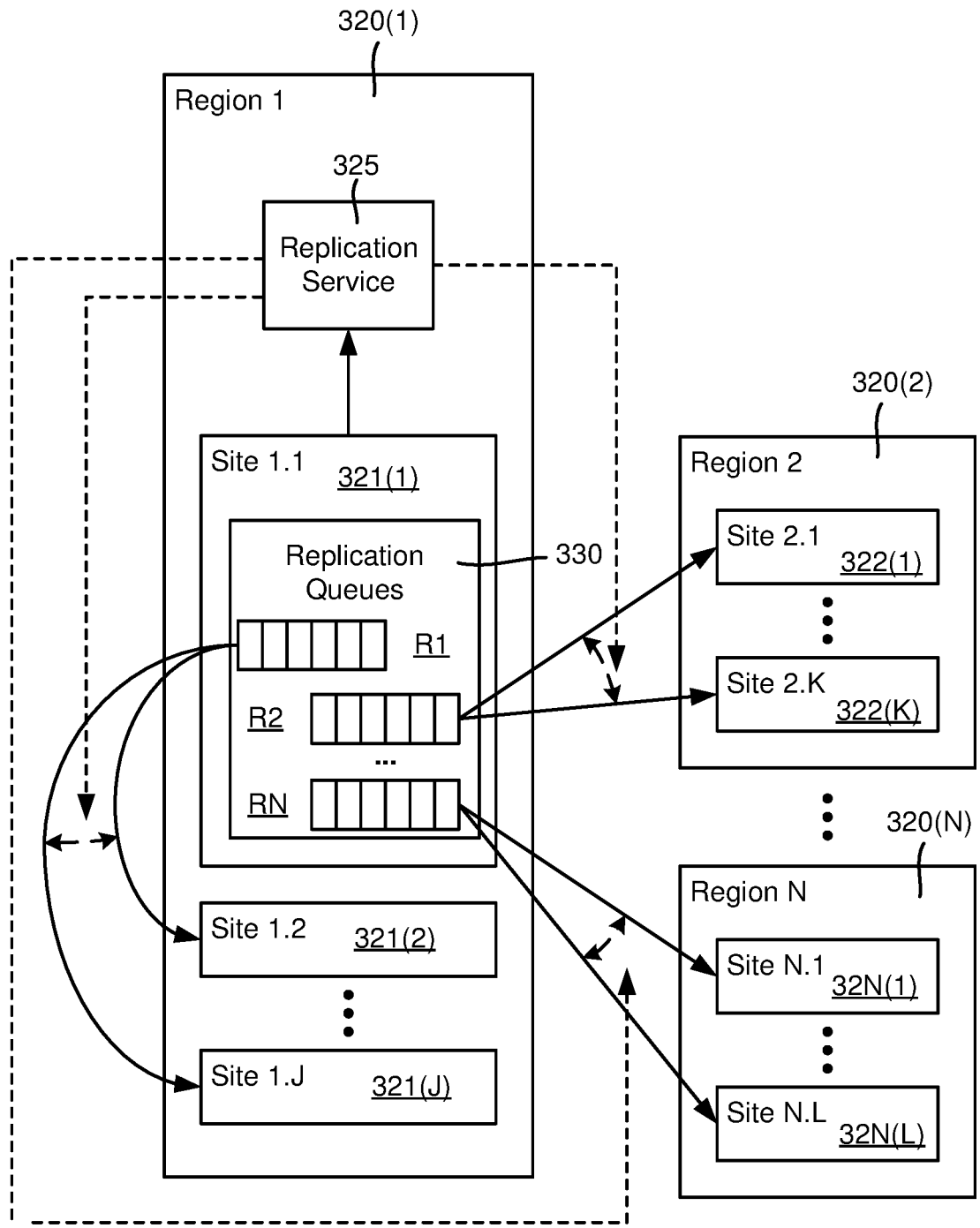
FIG. 3 is an example block diagram representing region-based replication queues maintained for replicating objects to sites of different regions, in accordance with various aspects and implementations of the subject disclosure.

As represented in FIG. 3, the replication queues R1-RN of replication tasks can be segmented by a replication destination region, to attempt to group individual objects destined for one region together and thereby achieve the effect of other bulk-mode replication schemes. A replication queue can be a first-in, first out (FIFO) list of the identifiers of the objects (object IDs) to replicate.

Thus, in the example of FIG. 3, the replication queue R1 is for same region replication to sites 321(1) to 321(J) for region 320(1). The replication queue R2 is for sites 322(1) to 322(K) for cross-replication region 320(1), and the replication queue RN is for cross region replication to sites 32N(1) to 32N(L) of region N 320(N). Although not explicitly shown, it is understood that similar replication queues are maintained at the other sites for object replication from those sites.

Thus, in the example of FIG. 3 a GEO setup comprises N regions, and an i-th region comprises Ni sites. Considering the replication process from the perspective of site 1.1 (321(1)) of region 1 320(1), as there are N regions, the site maintains N replication queues 330, one queue for each region R1-RN, including its home region. For instance, the replication queue R2 is for objects to be replicated to region 2 320(2). Note that the replication queues are bucket-agnostic, as objects' home buckets are irrelevant. Only the destination region, which follows from bucket replication policies, is relevant.

In one implementation, there is a dedicated set of resources for each replication source and destination region, e.g., an instance of the replication service as shown in FIG. 2. A replication service configured to replicate data to the i-th region works with the corresponding replication queue. The service uses blocking read from the queue until there is a first object to replicate to the destination region, after which, the service uses non-blocking reads from the queue to get more objects so as to replicate the data with minimal delays.

When there are multiple objects, the replication service takes multiple objects from one queue, packs them into a batch, and sends the batch to one site of the destination region. Note that for one region, the replication service can send the batches to the different sites of that region using a round-robin policy, or using a policy that attempts to level the amount of data replicated among the sites of one region.

Figure 4:
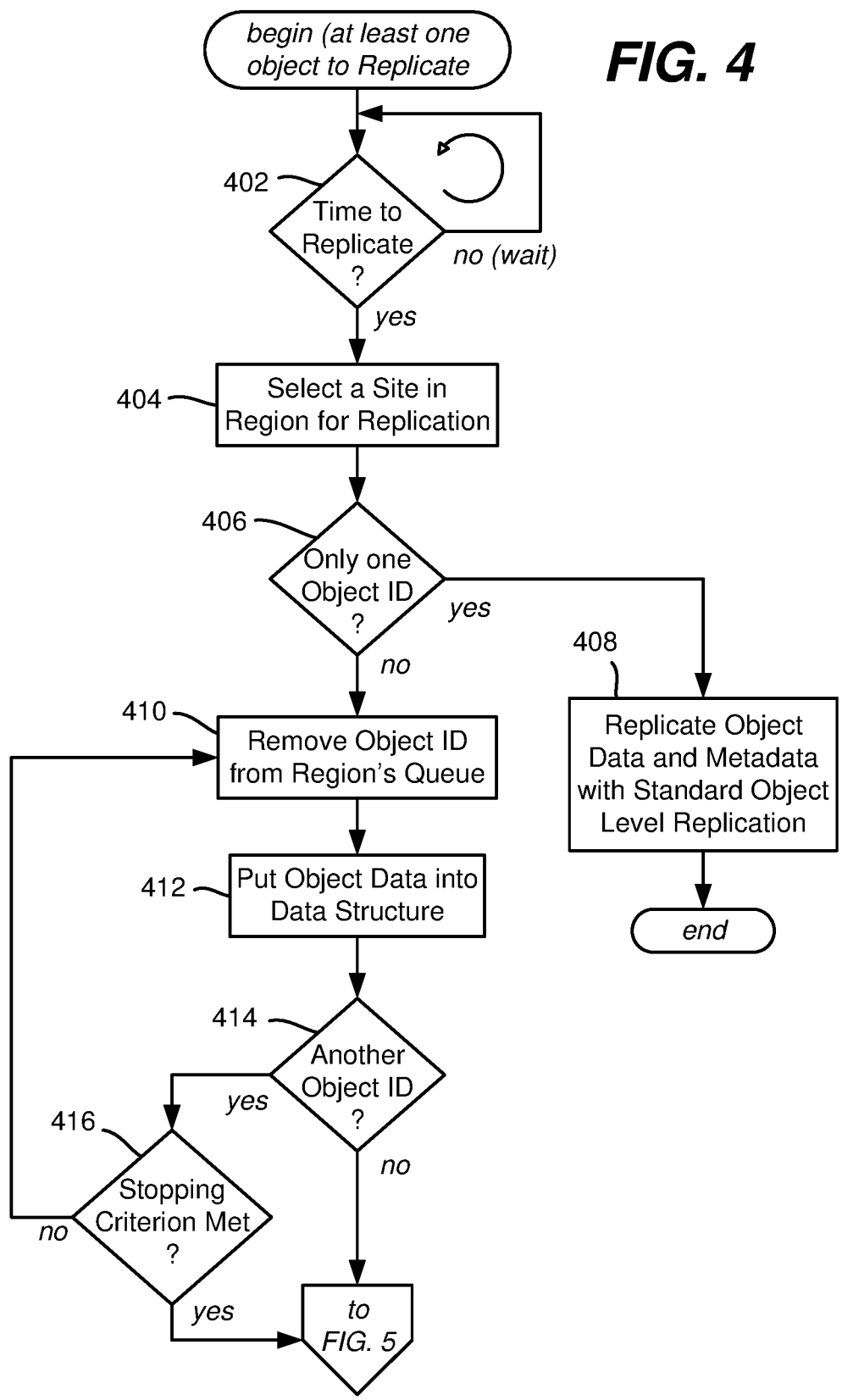
FIG. 4 and FIG. 5 comprise an example flow diagram showing example operations related to a replication service that replicates objects to a selected destination site of a region, in accordance with various aspects and implementations of the subject disclosure.
Figure 5:
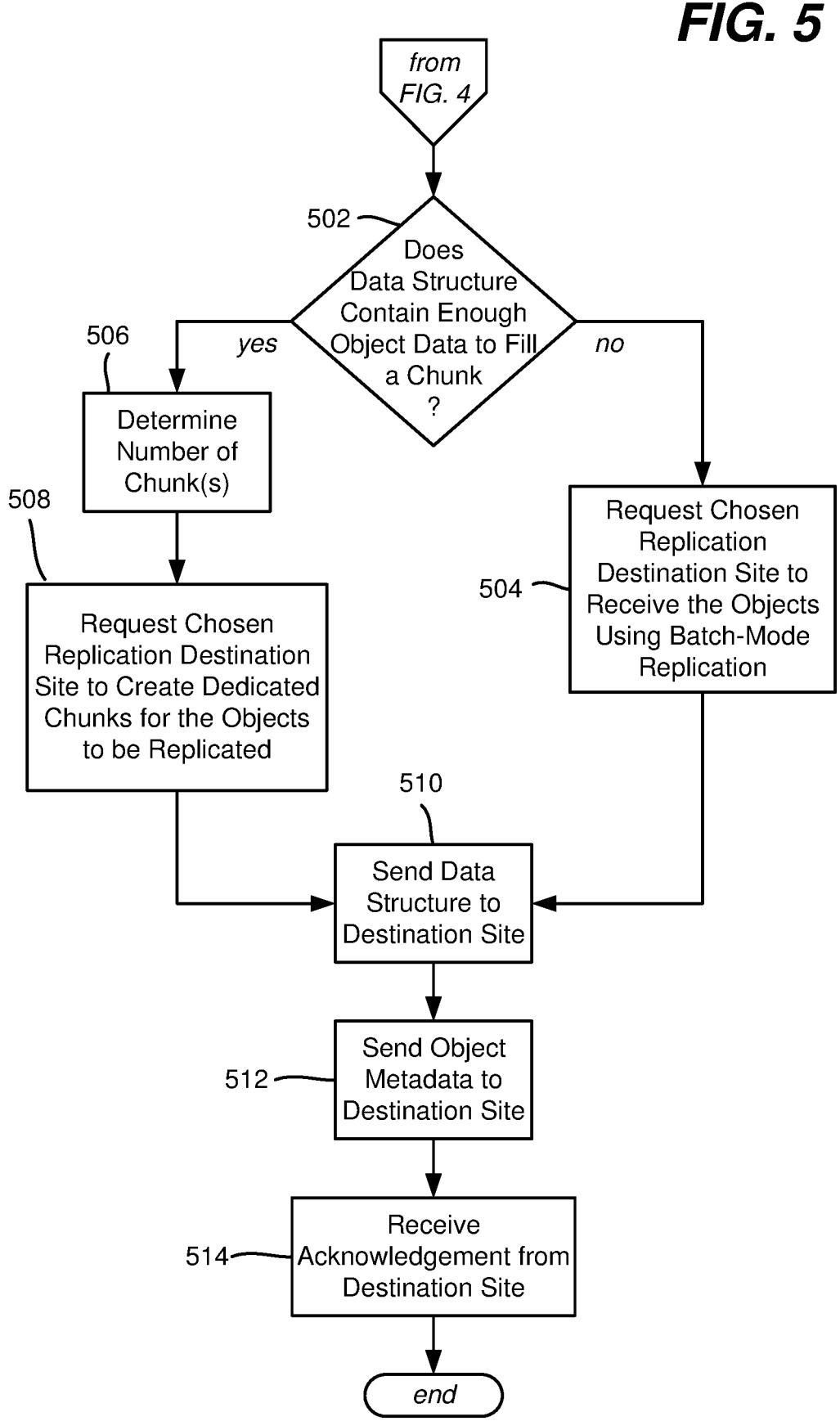

FIGS. 4 and 5 comprise a flow diagram showing example operations of a source replication service that has data of at least one object to be replicated. Operation 402 represents an optional step of waiting until the replication queue gets fuller, which can be for a time period or until some number or object IDs or the total size of the corresponding objects reaches a limit. Note that packing of objects to be replicated into batches is expected to introduce only insignificant replication delays because replication services need not wait for more objects. However some wait can be a beneficial tradeoff; e.g., if a replication service level agreement is ten minutes maximum (the maximum data replication lag), and it is known that replication of one chunk takes three minutes, then the replication service can wait for up to seven minutes in hope that there is enough object data to fill a chunk. Any such delays can be compensated for by use of a significantly more efficient data transfer mode.

Operation 404 selects the site in the region (the region that corresponds to the replication queue). This can be by load balancing, which can be decided in a straightforward manner by tracking the amount of data that has been replicated to each site of the destination region. When starting another replication session, the replication service chooses the site that has received the least amount of data, as the selected replication destination site.

Operation 406 checks whether there is only one object to replicate. If the replication service fails to get multiple objects, the service falls back to the standard object-level replication at operation 408. Standard objet level replication including sending the object data and metadata, and receiving an acknowledgement is known in general, and thus is not described in detail herein.

If there are multiple objects, operation 410 represents dequeuing the object ID, and operation 412 puts the object into a data structure for sending to the destination site. Object 414 checks whether there is another object ID in the replication queue, and if so, branches to operation 416 to check for whether a stopping criterion (or criteria) is met. The stopping criterion is a precaution to ensure that there is no endless replication session caused by a steady stream of new objects to be replicated to one region. The replication service may stop adding objects to a batch data structure when the current object data fits well into an integer number of dedicated chunks, or if the size of the current batch data structure exceeds some predefined capacity threshold, e.g. five chunk sizes. If not, operation 416 returns to operation 410 to dequeue another object ID and add more object data to the batch data structure.

If there are no more replication tasks (object IDs) in the replication queue for this destination site, or if the stopping criterion or criteria is met, the process continues to FIG. 5 to send the batch data structure to the destination site.

Operation 502 of FIG. 5 evaluates whether the replication service had enough object data to fill one or multiple complete chunks. If the replication service gets multiple objects that cannot fill even one complete chunk (to a threshold percentage), at operation 504 the service requests the remote site it has chosen as a replication destination to receive the objects using batch-mode replication. Otherwise, at operation 506 the replication service determines the number of chunks, and at operation 508 requests the replication destination site to create one or multiple dedicated chunks for the objects to be replicated.

Operation 510 represents sending the batch data structure to the replication destination site. Operation 512 represents sending the object metadata. The data that is communicated includes enough information for the destination site to unpack the batch data structure into objects, whether as individual objects or into chunks. At some point under normal circumstances the replication service receives an acknowledgment from the destination site. Note that the replication service can keep a copy of the batch data structure, the metadata, and/or the replication queue so that the information is not lost in the event of a failure.

Figure 6:
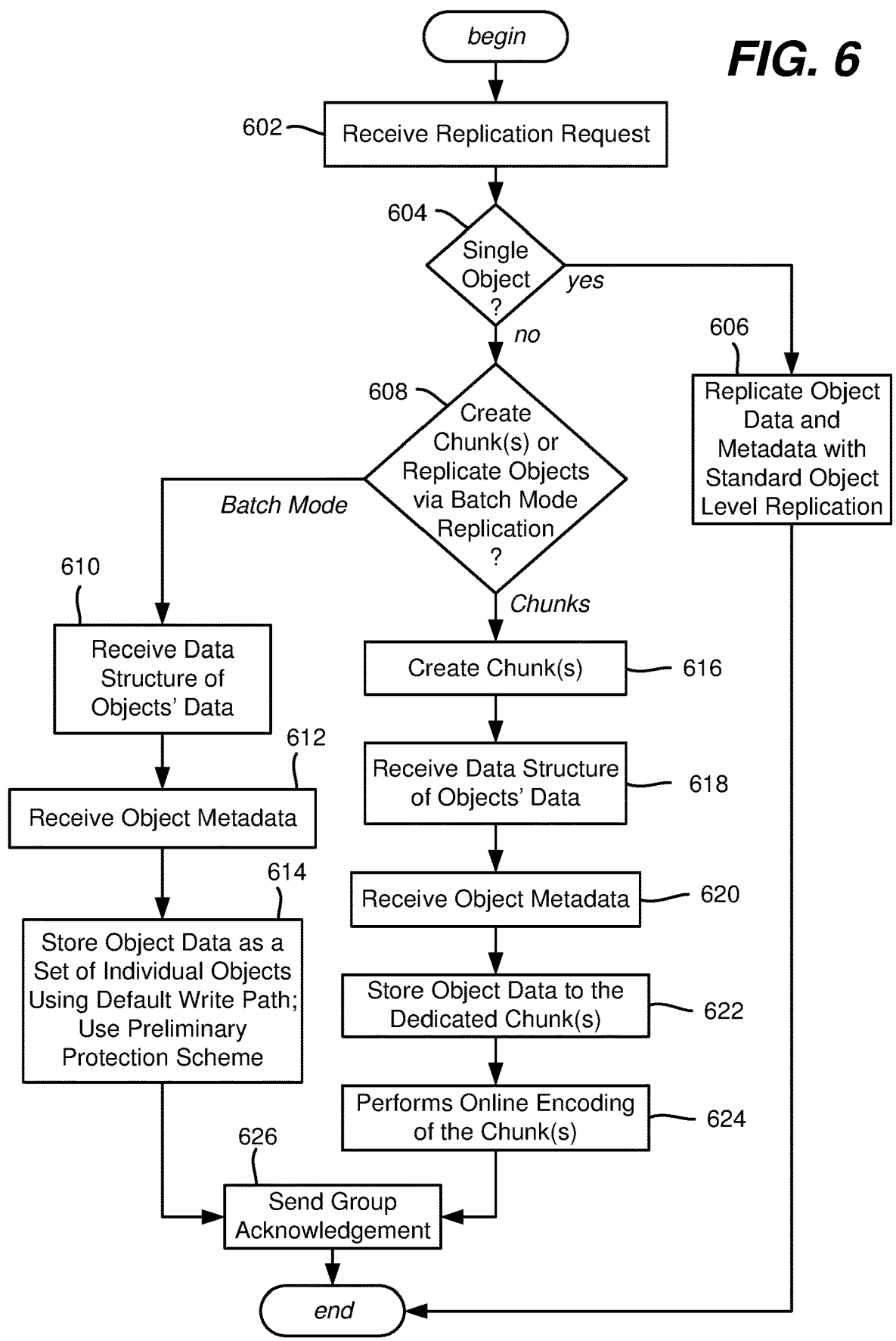
FIG. 6 is an example flow diagram showing example operations related to a replication service that receives object data for replication, in accordance with various aspects and implementations of the subject disclosure.

FIG. 6 represents the example operations of the replication service at the destination site that receives the object data to replicate, beginning at operation 502 where a replication request is received from the object data sender. Note that the request may include or correspond to a single object to replicate, and if so, operations 604 and 606 replicate the single object's data and metadata using standard object level replication, and the destination site's process ends.

If not a single object, then the replication request is directed to chunk creation or batch mode replication of multiple individual objects that do not fill a chunk, as evaluated at operation 608. If batch mode replication of multiple individual objects, operation 610 represents receiving the data structure, and operation 612 represents receiving the object metadata. The destination site's replication service stores the object data as a set of individual objects, using default write path. Note that because no chunk is yet involved, a preliminary protection scheme (e.g., mirroring) needs to be used to protect the objects. Further note that previous object data may exist, and thus it is possible that combining the new objects with the previous objects can fill a chunk, in which event a chunk can be created and sealed, and protected via encoding. Operation 626 sends a group acknowledgement back to the sending source replication service.

Returning to operation 608, if there are one or more chunks to be created, the destination site creates the chunks at operation 616, receives the object data and metadata (operations 618 and 620), and stores the object data to the dedicated chunks at operation 622. Operation 624 performs online encoding of the chunks, which protects them without needing a preliminary protection scheme. Operation 626 sends a group acknowledgement for the objects stored in the already encoded chunks.

It should be noted that the operations of FIG. 6 can be performed more than once for the same replication session. For example, consider that the source replication service has enough object data to fill three full chunks, but not enough to fill four. The source replication service can request creation of the three chunks and object replication to those chunks, and separately request batch mode replication for individual objects that do not fill another chunk. Alternatively, such "extra" object data can be replicated to another destination site in the region corresponding to the replication queue, possibly with later received object data to replicate that does fill at least one chunk.

Figure 7:
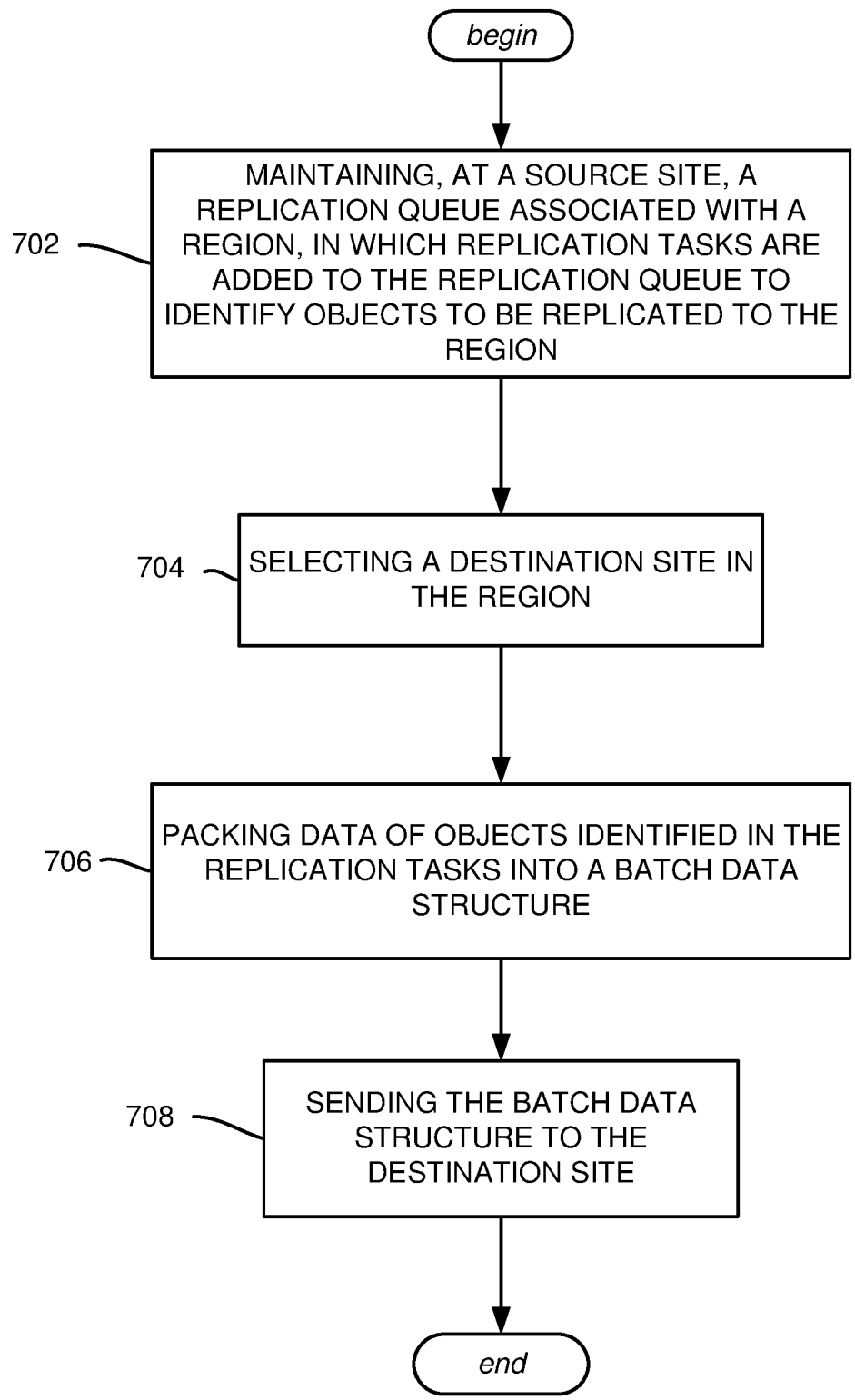
FIG. 7 is a flow diagram showing example operations related to packing object data into a batch data structure based on replication tasks, and sending the batch data structure to a destination replication site, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents maintaining, at a source site, a replication queue associated with a region, in which replication tasks are added to the replication queue to identify objects to be replicated to the region. Operation 704 represents selecting a destination site in the region. Operation 706 represents packing data of objects identified in the replication tasks into a batch data structure. Operation 708 represents sending the batch data structure to the destination site.

Further operations can comprise notifying the destination site to receive the batch data structure via batch-mode replication.

The destination site can be in a same region as the source site. The destination site can be in a different region from the source site.

Selecting the destination site in the region can comprise selecting the destination site from a group of available destination sites in the region based on at least one of: round-robin selection or load balancing-based selection.

The destination site can be a first destination site, wherein the replication tasks can be first replication tasks, wherein the objects can be first objects, the data of the first objects can be first data, the batch data structure can be a first batch data structure, and further operations can comprise, selecting a second destination site in the region, dequeuing second replication tasks from the replication queue that identify second objects to be replicated to the second destination site, packing second object data corresponding to the second replication tasks into a second batch data structure, and sending the second batch data structure to the second destination site. Further operations can comprise selecting the second destination site based on an amount of data replicated to the first destination site.

The destination site can be a first destination site, the replication tasks can be first replication tasks, the objects can be first objects, the data of the first objects can be first data, and further operations can comprise dequeuing second replication tasks from the replication queue that identify second objects to be replicated to the second destination site, selecting a second destination site in the region, determining that the second objects to be replicated to the second destination site fill one or more chunks, requesting the second destination site create one or more dedicated chunks corresponding to the one or more chunks for the second object data, and sending the second object data to the second destination site for replication storage in the one or more dedicated chunks.

The replication queue can be a first replication queue, and further operations can comprise determining whether the batch data structure fits into one or more chunks when packed, and in response to the determining that the batch data structure fits into the one or more chunks, halting the dequeuing of replication tasks from the first replication queue, and adding the additional replication asks to a second replication queue associated with a different region.

The replication queue can be a first replication queue, and further operations can comprise determining whether the batch data structure exceeds a capacity threshold when packed, and in response to the determining that the batch data structure exceeds the capacity threshold, halting the dequeuing of replication tasks from the first replication queue.

Figure 8:
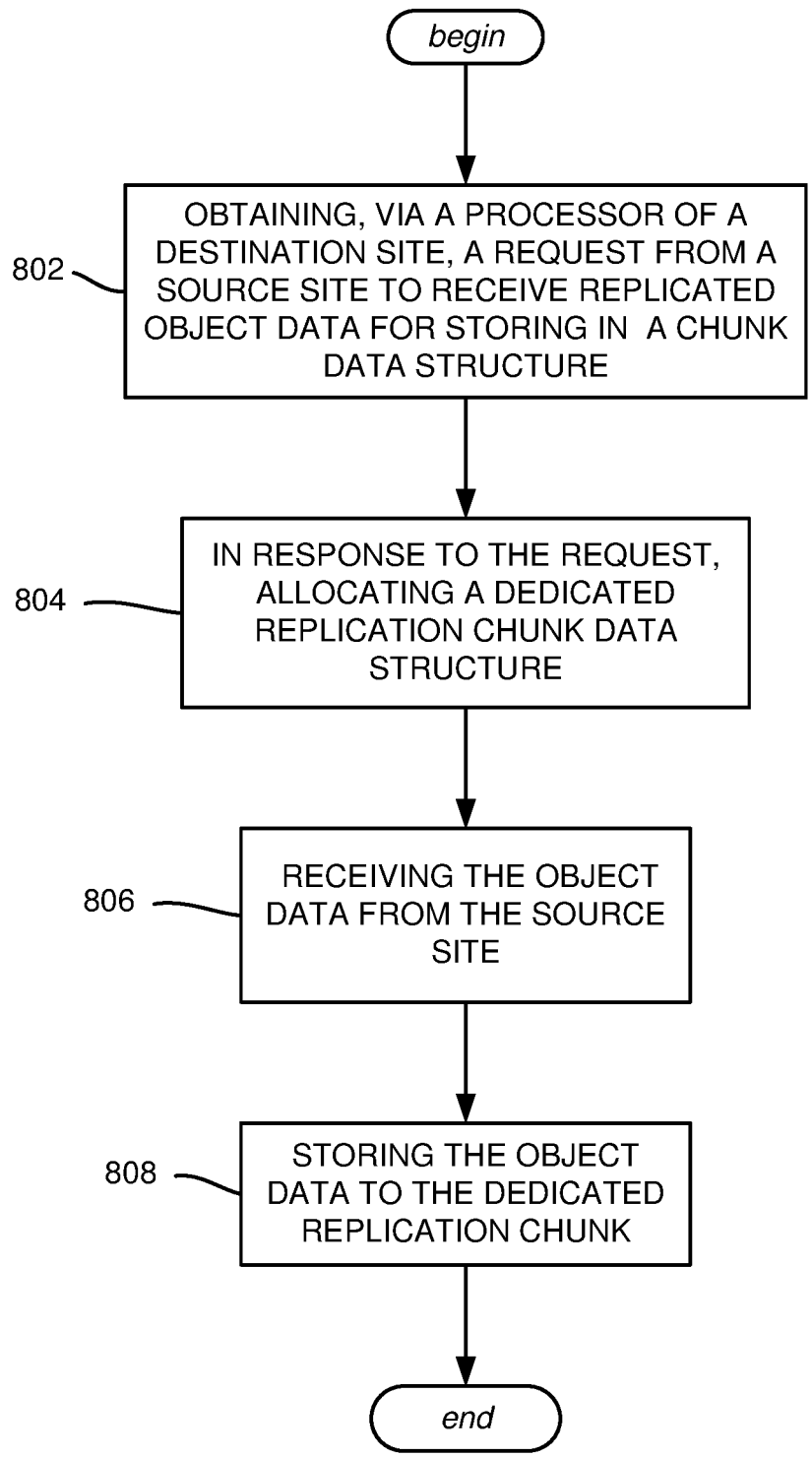
FIG. 8 is an example flow diagram showing example operations related to handling replicated objects when received at a replication destination site, in accordance with various aspects and implementations of the subject disclosure.

One or more example aspects, such as corresponding to example operations of a method, are represented in FIG. 8. Operation 802 represents obtaining, via a processor of a destination site, a request from a source site to receive replicated object data for storing in a chunk data structure. Operation 804 represents in response to the request, allocating a dedicated replication chunk data structure. Operation 806 represents receiving the object data from the source site. Operation 808 represents storing the object data to the dedicated replication chunk.

Storing the object data in the dedicated replication chunk can comprise performing erasure coding on the dedicated replication chunk to generate chunk fragments, storing the chunk fragments among distributed storage units of the destination site, and sending a group acknowledgement for the object data to the source site.

The request can be a first request, and aspects can comprise, receiving a second request from the source site to receive object data for objects using batch-mode replication, receiving a batch data structure containing the replicated object data, and storing the object data as individual objects replicated to the destination site. Aspects can comprise protecting the individual objects via a preliminary protection scheme. Aspects can comprise sending an acknowledgement to the source site after protecting the individual objects via the preliminary protection scheme.

Figure 9:
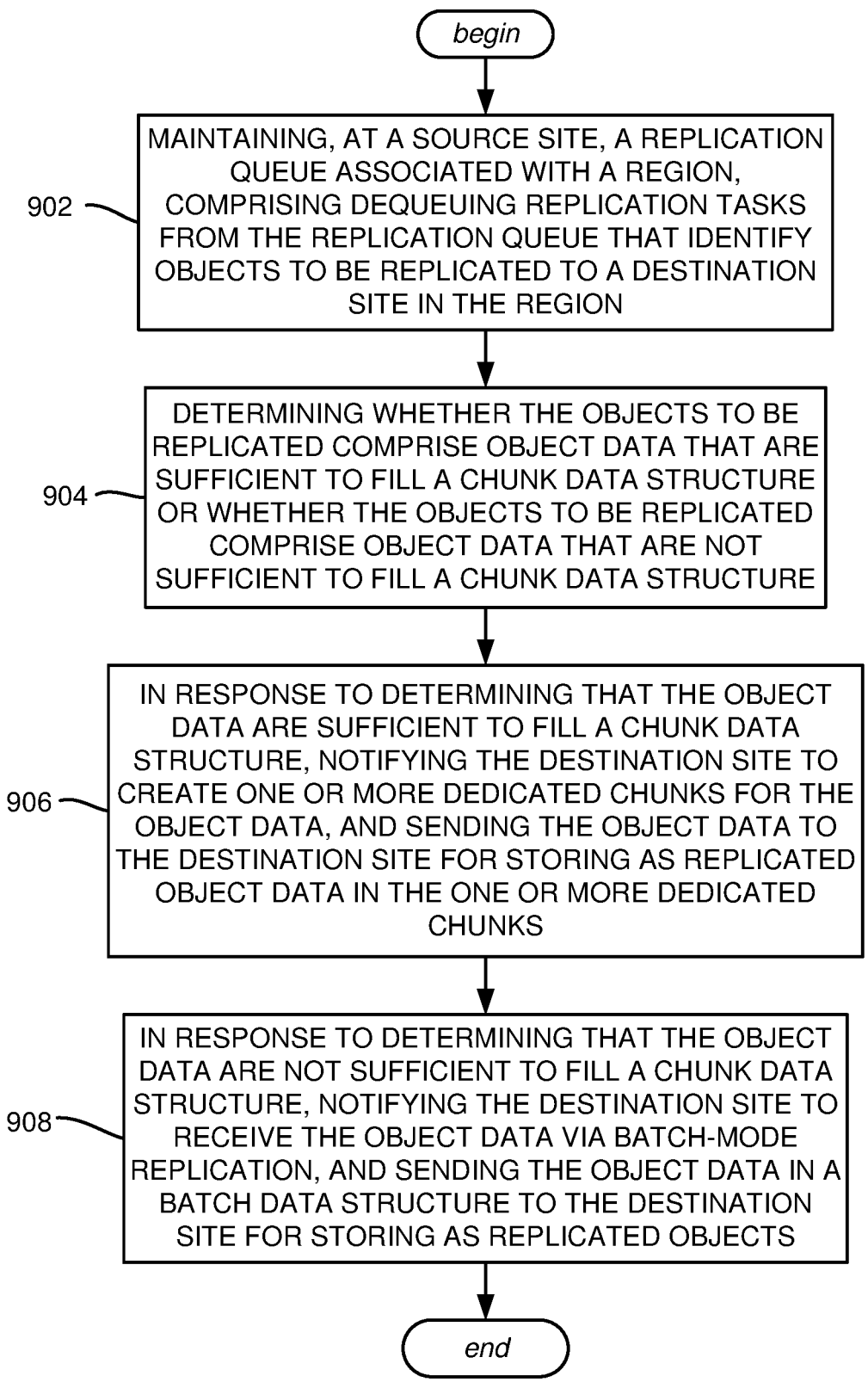
FIG. 9 is an example flow diagram showing example operations related to sending object data to a replication destination site for different handling based on whether the object data fills one or more chunk data structures or does not, in accordance with various aspects and implementations of the subject disclosure.

FIG. 9 summarizes various example operations, e.g., corresponding to a machine-readable storage medium, comprising executable instructions that, when executed by a processor of a data storage system, facilitate performance of operations. Operation 902 represents maintaining, at a source site, a replication queue associated with a region, comprising dequeuing replication tasks from the replication queue that identify objects to be replicated to a destination site in the region. Operation 904 represents determining whether the objects to be replicated comprise object data that are sufficient to fill a chunk data structure or whether the objects to be replicated comprise object data that are not sufficient to fill a chunk data structure. Operation 906 represents, in response to determining that the object data are sufficient to fill a chunk data structure, notifying the destination site to create one or more dedicated chunks for the object data, and sending the object data to the destination site for storing as replicated object data in the one or more dedicated chunks. Operation 908 represents, in response to determining that the object data are not sufficient to fill a chunk data structure, notifying the destination site to receive the object data via batch-mode replication, and sending the object data in a batch data structure to the destination site for storing as replicated objects.

Further operations can comprise selecting the destination site from a group of available destination sites in the region based on at least one of: round-robin selection or load balancing-based selection.

Dequeuing the replication tasks from the replication queue can comprise dequeuing the replication tasks after a time period.

The region can be a first region, the replication queue can be a first replication queue, and further operations can comprise dequeuing an additional replication task from a second replication queue associated with a second region. The additional replication task can be a first additional replication task, and no additional replication tasks can be received within a replication time period; further operations can comprise replicating an object corresponding to the first additional replication task as an individual object via object-level replication.

As can be seen, described herein is technology that facilitates bulk mode replication of objects. When replication traffic is moderate and there are not enough objects to be replicated to fill a chunk data structure, the technology provides bulk-mode data replication, which is a desirable mode for data transfer over long distance. When replication traffic is high, and there are enough objects to fill one or more chunk data structures, the technology provides bulk-mode data replication while also avoiding the need for inefficient preliminary data protection at the replication destination side by having the object data stored into chunk data structures that are directly erasure encoded for data protection. When replication traffic to a given region is low, and only a single object needs to be replicated, standard object-level replication is used, which is not significant because replication throughput is not a concern when replication traffic is low. The technology thus facilitates high-performance data transfer to remote sites and efficient handling of data at the replication destination side.

Figure 10:
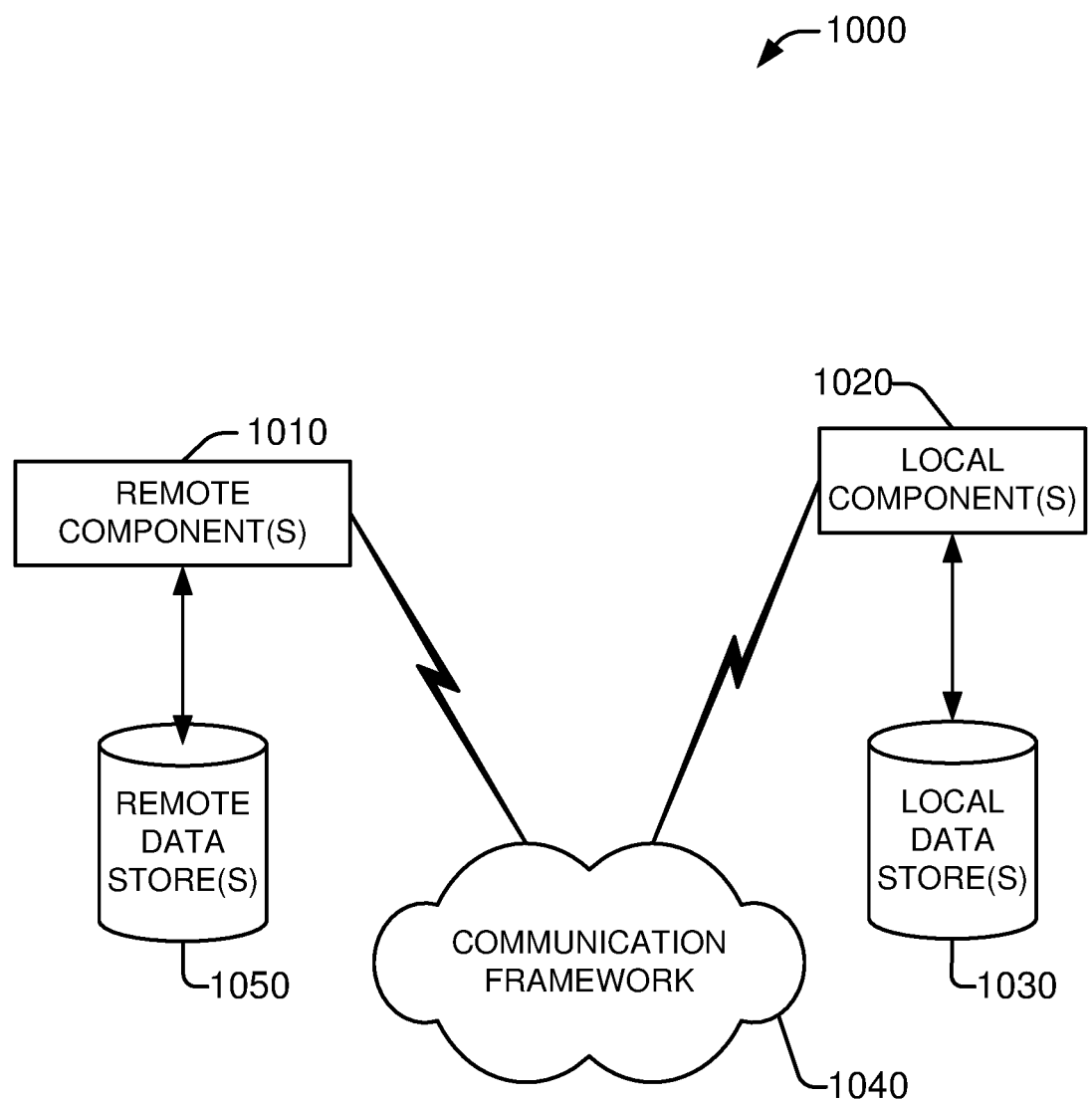
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
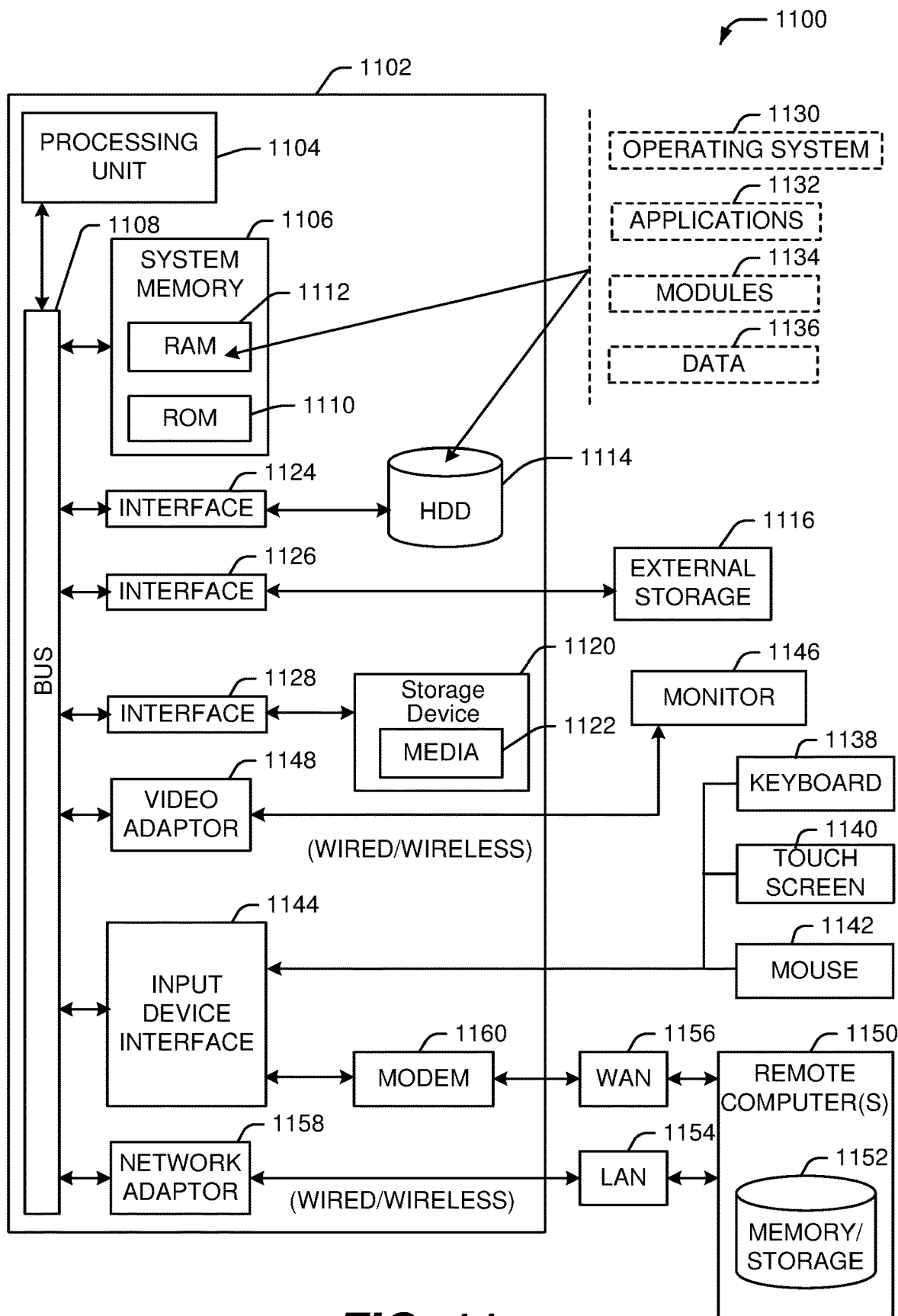
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
maintaining, at a source site, a replication queue associated with a region, in which replication tasks are added to the replication queue to identify objects to be replicated to the region;
selecting a destination site in the region;
packing data of objects identified in the replication tasks into a batch data structure;
in response to determining that a portion of the data is insufficient to fill a chunk to a threshold data volume, idling the packing for a selectable time to facilitate collection of additional replication tasks into the batch data structure, and in response to determining that the portion of the data remains insufficient to fill the chunk to the threshold data volume after the selectable time elapses, enabling storage of the potion of the data at the destination site via the batch data structure;
in response to determining that the portion of the data is sufficient to fill the chunk to the threshold data volume, grouping the portion of the data into a chunk filling group of the batch data structure; and
sending the batch data structure to the destination site, wherein, in response the chunk filling group being populated, the portion of the data corresponding to the chunk filling group is writable into the chunk at the destination site.

2. The system of claim 1, wherein the operations further comprise notifying the destination site to receive the batch data structure via batch-mode replication.

3. The system of claim 1, wherein the destination site is in a same region as the source site.

4. The system of claim 1, wherein the destination site is in a different region from the source site.

5. The system of claim 1, wherein the selecting the destination site in the region comprises selecting the destination site from a group of available destination sites in the region based on at least one of: round-robin selection or load balancing-based selection.

6. The system of claim 1, wherein the destination site is a first destination site, wherein the replication tasks are first replication tasks, wherein the objects are first objects, wherein the data of the first objects is first data, wherein the batch data structure is a first batch data structure, and wherein the operations further comprise, selecting a second destination site in the region, dequeuing second replication tasks from the replication queue that identify second objects to be replicated to the second destination site, packing second object data corresponding to the second replication tasks into a second batch data structure, and sending the second batch data structure to the second destination site.

7. The system of claim 6, wherein the operations further comprise selecting the second destination site based on an amount of data replicated to the first destination site.

8. The system of claim 1, wherein the destination site is a first destination site, wherein the replication tasks are first replication tasks, wherein the objects are first objects, wherein the data of the first objects is first data, and wherein the operations further comprise, dequeuing second replication tasks from the replication queue that identify second objects to be replicated to the second destination site, selecting a second destination site in the region, determining that the second objects to be replicated to the second destination site fill one or more chunks, requesting the second destination site create one or more dedicated chunks corresponding to the one or more chunks for the second object data, and sending the second object data to the second destination site for replication storage in the one or more dedicated chunks.

9. The system of claim 1, wherein the replication queue is a first replication queue, and wherein the operations further comprise, determining whether the batch data structure fits into one or more chunks when packed, and in response to the determining that the batch data structure fits into the one or more chunks, halting the dequeuing of replication tasks from the first replication queue.

10. The system of claim 1, wherein the replication queue is a first replication queue, and wherein the operations further comprise, determining whether the batch data structure exceeds a capacity threshold when packed, and in response to the determining that the batch data structure exceeds the capacity threshold, halting the dequeuing of replication tasks from the first replication queue.

11. A method, comprising,
obtaining, via a processor of a destination site, a request from a source site to receive replicated object data via a batch data structure for storing in a chunk data structure;
in response to the request, allocating a dedicated replication chunk data structure;
in response to determining that the replicated object data is insufficient to fill the dedicated replication chunk data structure at the destination site, causing the source site to collect additional replicated object data into the batch data structure for a selectable time to facilitate batch communication of sufficient replicated object data to fill the dedicated replication chunk data structure at the destination site when received by the destination site;
receiving the object data from the source site via the batch communication;
storing the object data to the dedicated replication chunk; and
in response to determining that the replicated object data remains insufficient to fill the dedicated replication chunk data structure at the destination site after the selectable time elapses, receiving the replicated object data via the batch data structure for storage as data objects not comprised in the dedicated replication chunk data structure at the destination site.

12. The method of claim 11, wherein the storing the object data in the dedicated replication chunk comprises performing erasure coding on the dedicated replication chunk to generate chunk fragments, storing the chunk fragments among distributed storage units of the destination site, and sending a group acknowledgement for the object data to the source site.

13. The method of claim 11, wherein the request is a first request, and further comprising, receiving a second request from the source site to receive object data for objects using batch-mode replication, receiving a batch data structure containing the replicated object data, and storing the object data as individual objects replicated to the destination site.

14. The method of claim 13, further comprising protecting the individual objects via a preliminary protection scheme.

15. The method of claim 14, further comprising sending an acknowledgement to the source site after protecting the individual objects via the preliminary protection scheme.

16. A non-transitory machine-readable medium, comprising executable instructions that, when executed by a processor of a data storage system, facilitate performance of operations, the operations comprising:
maintaining, at a source site, a replication queue associated with a region, comprising dequeuing replication tasks from the replication queue that identify objects to be replicated to a destination site in the region;
determining whether the objects to be replicated comprise object data that are sufficient to fill a chunk data structure or whether the objects to be replicated comprise object data that are not sufficient to fill the chunk data structure;
in response to determining that the object data are sufficient to fill the chunk data structure, notifying the destination site to create one or more dedicated chunks for the object data, and sending the object data to the destination site for storing as replicated object data in the one or more dedicated chunks; and
in response to determining that the object data are not sufficient to fill the chunk data structure, collecting additional object data for a selectable amount of time to facilitate collection of sufficient object data to fill the chunk data structure when received by the destination site, and, where the selectable time elapses prior to the collection of sufficient object data to fill the chunk data structure, notifying the destination site to receive the object data via batch-mode replication, and sending the object data in a batch data structure to the destination site for storing as replicated objects outside the one or more dedicated chunks for the object data.

17. The non-transitory machine-readable medium of claim 16, wherein the operations further comprise, selecting the destination site from a group of available destination sites in the region based on at least one of: round-robin selection or load balancing-based selection.

18. The non-transitory machine-readable medium of claim 16, wherein the dequeuing the replication tasks from the replication queue comprises dequeuing the replication tasks after the selectable amount of time.

19. The non-transitory machine-readable medium of claim 16, wherein the region is a first region, wherein the replication queue is a first replication queue, and wherein the operations further comprise, dequeuing an additional replication task from a second replication queue associated with a second region.

20. The non-transitory machine-readable medium of claim 19, wherein the additional replication task is a first additional replication task, wherein no further additional replication tasks are received within the selectable amount of time, and wherein the operations further comprise, replicating an object corresponding to the first additional replication task as an individual object via object-level replication.

\* \* \* \* \*